(12) United States Patent
Jin et al.

(10) Patent No.: US 9,648,583 B2
(45) Date of Patent: May 9, 2017

(54) METHOD, APPARATUS, AND SYSTEM FOR PAGING USER EQUIPMENT

(71) Applicant: Huawei Technologies Co., Ltd., Shenzhen (CN)

(72) Inventors: Weisheng Jin, Shanghai (CN); Hai Liu, Shanghai (CN); Qiao Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/046,118

(22) Filed: Feb. 17, 2016

(65) Prior Publication Data

US 2016/0165573 A1    Jun. 9, 2016

Related U.S. Application Data

(63) Continuation of application No. 13/294,720, filed on Nov. 11, 2011, which is a continuation of application No. PCT/CN2009/071788, filed on May 13, 2009.

(51) Int. Cl.
| | |
|---|---|
| H04L 12/26 | (2006.01) |
| H04W 68/02 | (2009.01) |
| H04W 68/00 | (2009.01) |

(52) U.S. Cl.
CPC .......... *H04W 68/02* (2013.01); *H04W 68/00* (2013.01); *H04W 68/005* (2013.01)

(58) Field of Classification Search
CPC ... H04W 68/02; H04W 68/025; H04W 84/02; H04W 84/022; H04W 84/027; H04W 88/185
See application file for complete search history.

(56) References Cited

U.S. PATENT DOCUMENTS 5,369,681 A * 11/1994 Boudreau ............. H04W 68/08
                                                          455/458
5,533,094 A *  7/1996 Sanmugam ........... H04W 68/08
                                                          340/7.27
(Continued)

FOREIGN PATENT DOCUMENTS

| CN | 1592480 A | 3/2005 |
|---|---|---|
| CN | 1980466 A | 6/2007 |

(Continued)

OTHER PUBLICATIONS

"3rd Generation Partnership Project; Technical Specification Group Core Network and Terminals; 3GPP System Architecture Evolution; CT WG1 Aspects (Release 8)," 3GPP TR 24.801, V8.1.0, pp. 1-220, $3^{rd}$ Generation Partnership Program, Valbonne, France (Dec. 2008).

(Continued)

*Primary Examiner* — Alvin Zhu
(74) *Attorney, Agent, or Firm* — Leydig, Voit & Mayer, Ltd.

(57) ABSTRACT

A method, an apparatus, and a system for paging a User Equipment (UE) are provided. The method for paging a UE includes: sending a downlink data notification message inclusive of paging range indicator information to a core network control plane entity; receiving a paging message sent by the core network control plane entity and inclusive of a raging range; and initiating a paging to a UE corresponding to a user ID in the paging range. The apparatus for paging a UE includes: a first sending module, a first receiving module, and a paging initiating module. A system for paging a UE is further provided. With the method, apparatus, and system for paging a UE, the UE can be paged in only a set paging range.

20 Claims, 8 Drawing Sheets

(56) References Cited

U.S. PATENT DOCUMENTS

| | | |
|---|---|---|
| 2005/0037803 A1 | 2/2005 | Friman |
| 2008/0070594 A1 | 3/2008 | Barber |
| 2008/0205343 A1 | 8/2008 | Qian et al. |
| 2008/0220782 A1 | 9/2008 | Wang et al. |
| 2009/0017845 A1 | 1/2009 | Wu et al. |
| 2009/0270114 A1* | 10/2009 | Harris .................. H04W 68/10 455/458 |
| 2010/0069041 A1 | 3/2010 | Wang et al. |
| 2010/0210288 A1* | 8/2010 | Kim ..................... H04W 68/02 455/458 |
| 2010/0220680 A1* | 9/2010 | Ramankutty ......... H04W 68/08 370/329 |
| 2010/0297992 A1 | 11/2010 | Oyabu |
| 2011/0058542 A1* | 3/2011 | Nylander .............. H04W 68/00 370/338 |
| 2011/0189976 A1 | 8/2011 | Wu et al. |

FOREIGN PATENT DOCUMENTS

| | | |
|---|---|---|
| CN | 101043703 A | 9/2007 |
| CN | 101094501 A | 12/2007 |
| CN | 101272545 A | 9/2008 |
| CN | 101296404 A | 10/2008 |
| EP | 1971168 A1 | 9/2008 |
| JP | 2009060438 A | 3/2009 |
| WO | WO 2007051426 A1 | 5/2007 |
| WO | WO 2008112161 A2 | 9/2008 |
| WO | WO 2009057316 A1 | 5/2009 |
| WO | WO 2010127580 A1 | 11/2010 |

OTHER PUBLICATIONS

3rd Generation Partnership Project; Technical Specification Group Services and System Aspects; General Packet Radio Service (GPRS) enhancements for Evolved Universal Terrestrial Radio Access Network (E-UTRAN) access (Release 9), 3GPP TS 23.401, V9.0.0, pp. 1-226, $3^{rd}$ Generation Partnership Program, Valbonne, France (Mar. 2009).

"Paging optimization for CSG deployments," 3GPP TSG CT WG1 Meeting #55, Budapest, Hungary, C1-083536, $3^{rd}$ Generation Partnership Program, Valbonne, France (Aug. 18-22, 2008).

"Pseudo-CR on Option C for CSG deployments," 3GPP TSG CT WG1 Meeting #54, Zagreb, Croatia, C1-082792, $3^{rd}$ Generation Partnership Program, Valbonne, France (Jun. 23-27, 2008).

U.S. Appl. No. 13/294,720, filed Nov. 11, 2011.

* cited by examiner

METHOD, APPARATUS, AND SYSTEM FOR PAGING USER EQUIPMENT

CROSS-REFERENCE TO RELATED APPLICATIONS

This application is a continuation of U.S. patent application Ser. No. 13/294,720, filed on Nov. 11, 2011, which is a continuation of International Patent Application No. PCT/CN2009/071788, filed on May 13, 2009. The afore-mentioned patent applications are hereby incorporated by reference in their entireties.

FIELD OF THE INVENTION

The present invention relates to the field of communication technologies, and in particular, to a method, an apparatus, and a system for paging a User Equipment (UE).

BACKGROUND OF THE INVENTION

With the fast development of network technologies, the Internet access technology is improved constantly. To satisfy personalized requirements of different user groups, a Home NodeB emerges in a communication system. Being a kind of NodeB, the HNB is autonomously deployed in places such as homes, organizations, companies, or schools for exclusive use, and serves some specific users. The HNB may be set to allow only UEs with private network rights to reside or access; meanwhile, these UEs may also reside or access public networks. The home access (home access) mode is a new access mode being researched currently.

The home access mode connects a user equipment (User Equipment, UE for short) to a mobile network through a universal Internet Protocol (IP) access network by using an HNB and licensed spectrums. The licensed spectrum may include spectrums in multiple networks, for example, spectrums used in networks such as a UMTS Terrestrial Radio Access Network (UMTS Terrestrial Radio Access Network, UTRAN for short), an Evolved UMTS Terrestrial Radio Access Network (Evolved UMTS Terrestrial Radio Access Network, E-UTRAN for short), a Code Division Multiple Access (Code Division Multiple Access, CDMA for short) network, a Worldwide Interoperability for Microwave Access (Worldwide Interoperability for Microwave Access, Wimax for short) network, a Wireless Local Area Network (Wireless Local Area Network, WLAN for short), and a High Rate Packet Data (High Rate Packet Data, HRPD for short) network.

The HNB set in the home network generally needs to pass through a Home Gate Way (Home Gate Way, Home GW for short) before accessing the IP network. The Home GW aggregates HNBs and has functions such as routing and forwarding of signaling and data between HNBs and network elements in the mobile network, bearer management on a backhaul(backhaul) network (such as a digital subscriber line), Quality of Service (Quality of Service, QoS for short) management, and Network Address Translation. Logically, the HGW and the HNB are different network entities, and may be implemented by a same physical entity in specific physical implementation.

An Home Node B(Home Nobe B, HNB for short) Gate Way(Gate Way, GW), a Home evolved NodeB (Home evolved NodeB, HeNB for short) GW, and a Home non-3GPP WAP GW(Home non-3GPP WAP GW) are GWs of HNBs respectively connected to the HNB, HeNB, and Home non-3GPP WAP GW through the universal IP access network.

Mobility management elements include: a Mobility Management Entity (Mobility Management Entity, MME for short) in an E-UTRAN, a Serving GPRS Support Node (Serving GPRS Supporting Node, SGSN for short) in a GPRS/UMTS network, and a non-3GPP GW(non-3GPP GW) of a non-3GPP network for accessing a 3GPP network, for example, an Evolved Packet Data Gateway (Evolved Packet Data Gateway, EPDG for short) in a WLAN, an Access Service Network Gateway (Access Service Network Gateway, ASN GW for short) in a Wimax network, an Access Gateway (Access Gateway, AGW for short) in a CDMA network, and an HRPD Serving Gateway (HRPD Serving Gateway, HSGW for short) in an HRPD network.

In an existing 3G network, an HNB integrates functions of a Radio Network Controller (Radio Network Controller, RNC for short), an NB, and a Gateway GPRS Support Node (Gateway GPRS Supporting Node, GGSN for short), and can implement local routing. The data routed from the core network of a mobile operator enters a service network through an HNB GW and a GGSN; the data locally routed enters a home network through an integrated GGSN function; and the data locally routed and destined for the Internet enters the Internet through a broadband access network. In a local routing solution for an HNB in an enhanced packet network, to implement local routing of user data, the HNB (for the 3G access technology, the HNB integrates functions of the RNC and NB; for the evolved UMTS access technology, the HNB is an HeNB) further integrates functions of a Serving Gateway (Serving Gateway, S-GW for short) and a Packet Data Network Gateway (Packet Data Network Gateway, P-GW for short). The data routed from the core network of a mobile operator enters a service network, for example, an IMS and Internet, through an HNB (or HeNB) GW and a P-GW; the data locally routed enters the home network through the integrated P-GW function; and the data locally routed and destined for the Internet is sent to the Internet through a broadcast access network. The S-GW integrated in the HNB/HeNB serves all user plane data. In another local routing solution for an HNB in the enhanced packet network, to implement local routing of user data, the HNB (for the 3G access technology, the HNB integrates functions of the RNC and NB; for the evolved UMTS access technology, the HNB is an HeNB) further integrates functions of an S-GW and a P-GW. The data routed from the core network of a mobile operator enters a service network, for example, an IMS and Internet, through an HNB (or HeNB) GW and an S-GW and a P-GW of the core network; the data locally routed enters the home network through the S-GW and P-GW functions integrated in the HNB; and the data locally routed and destined for the Internet is sent to the Internet through a broadcast access network. The S-GW of the core network in the architecture serves the user plane data that enters and leaves the P-GW of the core network of the operator. The S-GW integrated in the HNB/HeNB serves the user plane data locally routed. In a third local routing solution for an HNB in the enhanced packet network, to implement local routing of user data, the HNB (for the 3G access technology, the HNB integrates functions of the RNC and NB; for the evolved UMTS access technology, the HNB is an HeNB) integrates functions of a P-GW. The data routed from the core network of a mobile operator enters a service network, for example, an IMS and Internet, through an HNB (or HeNB) GW and an S-GW and a P-GW of the core network; the data locally routed enters the home network through the P-GW functions integrated in the HNB; and the data locally routed and destined for the Internet is sent to the Internet through a broadcast access network. The S-GW of the core network in the architecture serves the user plane data that enters and leaves the P-GW of the core network of the operator. The S-GW of the core network provides only services of sending downlink data notifications to a core network control plane entity and triggering paging for the locally routed data.

During the implementation of the present invention, the inventor finds at least the following problem in the prior art: In the technical solutions of the prior art, the paging range of the UE cannot be controlled.

SUMMARY OF THE INVENTION

Embodiments of the present invention provide a method, an apparatus, and a system for paging a UE, so as to page the UE in a set paging range.

To achieve the above objective, a method for paging a UE provided in an embodiment of the present invention includes sending a downlink data notification message inclusive of paging range indicator information to a core network control plane entity; receiving a paging message sent by the core network control plane entity and inclusive of a raging range; and initiating a paging to a UE corresponding to a user ID in the paging range.

An apparatus for paging a UE provided in an embodiment of the present invention includes a first sending module, configured to send a downlink data notification message inclusive of paging range indicator information to a core network control plane entity; a first receiving module, configured to receive a paging message sent by the core network control plane entity and inclusive of a raging range; and a paging initiating module, configured to initiate a paging to a UE corresponding to a user ID in the paging range.

An apparatus for paging a UE provided in an embodiment of the present invention includes a second receiving module, configured to receive a downlink data notification message inclusive of paging range indicator information; a paging message generating module, configured to generate a paging message inclusive of a paging range according to the paging range indicator information; and a second sending module, configured to send the paging message inclusive of the paging range to an HNB.

A system for paging a UE provided in an embodiment of the present invention includes an HNB and a core network control plane entity. The HNB is configured to send a downlink data notification message inclusive of paging range indicator information to the core network control plane entity, receive a paging message sent by the core network control plane entity and inclusive of a paging range, and initiate a paging to a UE corresponding to a user ID in the paging range. The core network control plane entity is configured to generate the paging message inclusive of the paging range according to the downlink data notification message and send the paging message to the HNB.

By using the method, apparatus, and system for paging a UE according to embodiments of the present invention, a downlink data notification message inclusive of paging indicator information is sent to a core network control plane entity, and a paging message inclusive of a paging range and a user ID is received from the core network control plane entity, so that a paging is initiated to the UE in the set paging range.

DETAILED DESCRIPTION OF THE EMBODIMENTS

The present invention is hereinafter described in detail with reference to embodiments and accompanying drawings.

Figure 1:
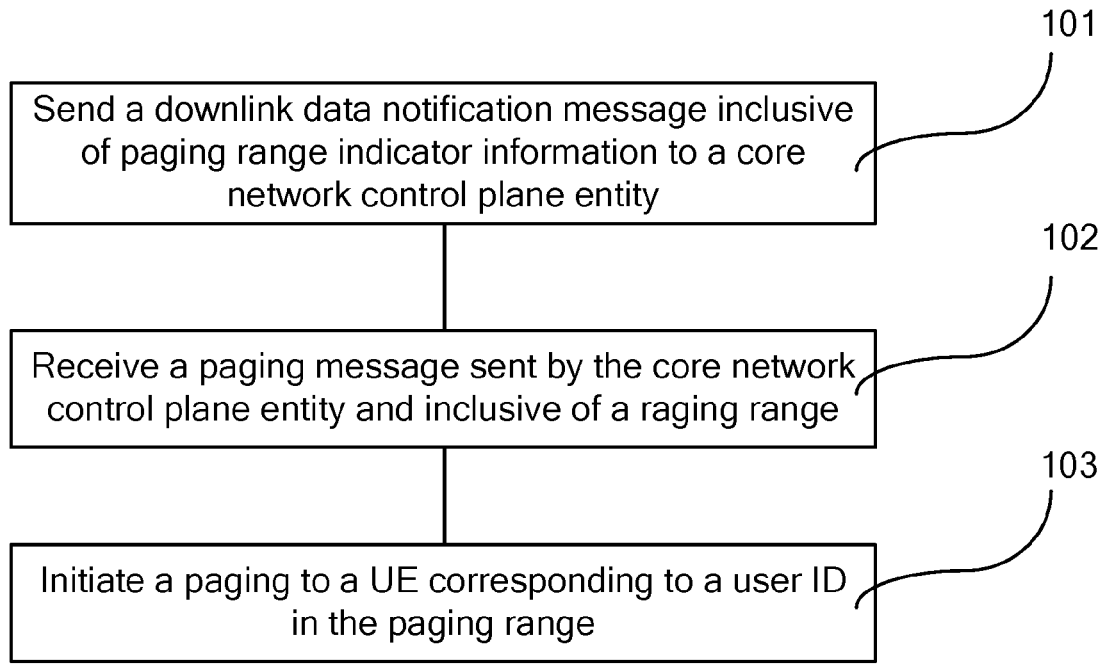
FIG. 1 is a schematic flowchart of an embodiment of a method for paging a UE according to an embodiment of the present invention.

The HNB in embodiments of the present invention may be an HNB or an HeNB. FIG. 1 is a schematic flowchart of an embodiment of a method for paging a UE according to an embodiment of the present invention. As shown in FIG. 1, the method includes the following steps:

Step 101: Send a downlink data notification message inclusive of paging range indicator information to a core network control plane entity. Specifically, this step may be as follows: The HNB or HNB GW sends a downlink data notification message to the core network control plane entity when receiving downlink data, where, if the HNB receives downlink data, the downlink data notification message sent by the HNB may be sent to the HNB GW first and then the HNB GW sends the downlink data notification message to the core network control plane entity; the HNB may also send the downlink data notification message to the core network control plane entity directly, in this case, the IP packet of the message may not pass through the HNB GW, or the IP packet of the message may pass through the HNB GW, and the HNB GW then transmits the message to the core network control plane entity transparently; when the HNB is connected to the core network control plane entity through the HNB GW but the HNB sends the downlink data notification message to the core network control plane entity directly, the downlink data notification message may further carry an ID or address of the HNB GW connected to the HNB, and the core network control plane entity may use the information to determine the HNB GW to which a paging message needs to be sent. The paging range indicator information may include paging indicator information and the paging range determined by the HNB or HNB GW.

Step 102: Receive a paging message including a paging range sent by the core network control plane entity. The paging range is a range of NBs which is needed to page the UE, and the paging message may be sent to only the NBs in the paging range. Accordingly, if the HNB GW is deployed in the network, the HNB GW to which the paging message needs to be sent may be determined. A user ID may be used to determine the UE to be paged.

In a way different from step 101, the paging range may also be determined by the core network control plane entity according to the stored ID or address of the HNB or HNB GW where the UE resides, initiates a service, or updates the location area (the location area may be a routing area and/or a tracking area) last time; in this case, the paging indicator information in the downlink data notification message sent by the HNB or HNB GW to the core network control plane entity does not need to carry the ID or address of the HNB or HNB GW, and the downlink data notification may also not carry paging indicator information. The UE is paged in only one HNB connected to the HNB GW. After determining the HNB GW, the core network control plane entity sends the paging message carrying the ID or address of the HNB to the HNB GW, and the HNB GW sends the paging message to the corresponding HNB; in other embodiments of the present invention, the core network control plane entity may also determine the paging range according to the stored ID or address of the HNB or HNB GW where the UE in the connected state resides last time.

Step 103: Initiate a paging to the UE corresponding to the user ID in the paging range. In this step, the UE may be determined by using a user ID.

In this embodiment, a downlink data notification message inclusive of paging indicator information is sent to the core network control plane entity, and a paging message sent to the specific paging range is received from the core network control plane entity, so that the UE can be paged in the specific paging range.

The paging indicator information in the above embodiment of the present invention may be obtained by analyzing the source address information, destination address, and service type of a downlink packet, the Access Point Name (APN) of the PDN of the downlink data source, the P-GW of the downlink data source or other data descriptions, and is used to indicate the range of the paging, for example, the ID of an HNB or HNB GW, where the ID may also be an IP address. That is, the paging indicator information is obtained in step 101, and the paging range is determined according to the paging indicator information and is sent to the core network control plane entity through the downlink data notification message. Specifically, the above data description information may indicate that the downlink packet is routed by the P-GW integrated in the HNB or the P-GW of the core network to the HNB.

In addition, the source address information, destination address, data type description, and service type of the downlink packet, the APN of the PDN of the downlink data source (the address or ID of the P-GW connected to the PDN may also be included), and the ID or address of the HNB or HNB GW may be sent to the core network control plane entity as paging indicator information; after receiving the downlink data notification message, the core network control plane entity obtains the paging range indicator information and determines the paging range according to the paging range indicator information. If the HNB GW is configured in the network, the HNB receives the downlink data, and the downlink data notification message sent by the HNB and inclusive of paging indicator information may be sent to the core network control plane entity directly, or may also be sent to the HNB GW first and then sent by the HNB GW to the core network control plane entity. The paging indicator information sent by the HNB GW to the core network control plane entity may be the original information sent by the HNB, or may also be regenerated by the HNB GW according to the paging indicator information sent by the HNB. If the paging indicator information sent by the HNB does not include the ID of the HNB, the paging indicator information sent by the HNB GW to the core network control plane entity may also include the ID of the HNB that is added by the HNB GW.

In step 101 above, if the downlink data notification message carries no available user ID but includes the destination address of the downlink data because the HNB does not store UE context, the process may further include the following step: The core network control plane entity or HNB GW searches for and obtains the stored context information of the UE according to the destination address or other information in the paging indicator carried in the downlink data notification message, where the context information includes the user ID. When obtaining the context information of the UE fails, the core network control plane entity sends a paging error message inclusive of the destination address to the HNB GW or HNB.

The paging message in step 102 above includes the paging range. The paging range may be differentiated by the ID of the HNB, Closed Subscriber Group (CSG) list information of the UE, or user registration area information explicitly, or may be implicit descriptions about the notified paging range sent by the core network control plane entity, for example, indicating that the paging message is sent to only the HNB that sends the downlink data notification message, and the paging message needs to include one or more of the above items.

Step 102 may be specifically as follows: The HNB receives the paging message that is generated and sent by the core network control plane entity according to the downlink data notification message and paging indicator information carried therein and includes the user ID. This case is applicable to the scenario where no HNB GW is available in the network and the HNB and the core network control plane entity are connected directly. If the HNB GW is deployed in the network, and the HNB receives the paging message sent by the HNB GW and inclusive of the user ID, the paging message may be generated according to the downlink data notification message and the paging indicator information and sent by the core network control plane entity to the HNB GW, and include the paging range (HNB ID) and user ID, and the HNB GW is only responsible for sending the paging message to the corresponding NB; the paging message may also be sent by the HNB GW to the corresponding NB after the HNB GW determines the paged NB according to the paging message which is sent by the core network control plane entity and includes the paging range indicator.

When the HNB GW forwards the paging message, further, the process may be specifically as follows: The HNB GW determines, according to the user registration area information and/or CSG list information, the HNB to be paged and sends the paging message; or the HNB GW sends the paging message to the HNB indicated by the HNB ID; or the HNB GW sends the paging message to the HNB where the UE in the connected state is attached lately in the range controlled by the HNB GW.

In addition, after initiating a paging to the UE corresponding to the user ID in the paging range, if the paging response of the UE is not received within a preset period of time, the core network control plane entity determines that the paging range is the user registration area, sends the paging message to all NBs within the UE registration area, and pages the UE.

In addition, after initiating a paging to the UE corresponding to the user ID in the paging range in step 103, if the NB where the UE responds to the paging is different from the NB that receives the downlink data, the NB that receives the downlink data forwards the downlink data to the NB where the UE responds to the paging.

When the UE responds to the paging and the core network control plane entity sends an initial UE bearer request message to the NB, the core network control plane entity may establish only part of bearers of a PDN connection, where the PDN connection is the PDN connection that sends the downlink data notification message; the core network control plane entity determines the paging range according to the APN carried in the paging indicator information in the downlink data notification message.

Figure 2:
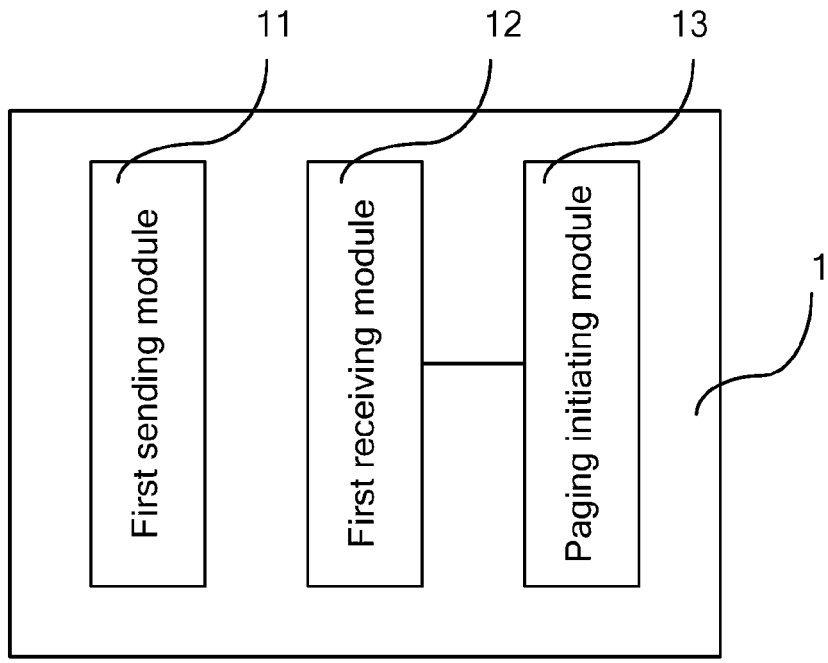
FIG. 2 is a schematic structure diagram of a first embodiment of an apparatus for paging a UE according to an embodiment of the present invention.

FIG. 2 is a schematic structure diagram of the first embodiment of an apparatus for paging a UE according to an embodiment of the present invention. As shown in FIG. 2, the apparatus 1 for paging a UE includes a first sending module 11, a first receiving module 12, and a paging initiating module 13. The first sending module 11 is configured to send a downlink data notification message sent by a core network control plane entity and inclusive of paging indicator information. The first receiving module 12 is configured to receive a paging message sent by the core network control plane entity and inclusive of a paging range. The paging initiating module 13 is configured to initiate a paging to the UE corresponding to a user ID in the paging range.

The apparatus for paging a UE according to this embodiment sends a downlink data notification message inclusive of paging indicator information, and receives a paging message sent by the core network control plane entity and inclusive of a paging range, so that the paging range of the UE can be controlled.

The first sending module and the first receiving module may be set in the HNB or HNB GW, and the paging initiating module is usually set in the HNB.

The first sending module in the embodiment above includes an information obtaining unit, a first determining unit, and a sending unit. The information obtaining unit is configured to obtain paging indicator information, where the paging indicator information includes at least one of the source address information of a downlink packet, destination address of the downlink packet, service type of the downlink packet, APN of the PDN of the downlink data source, and P-GW of the downlink data source. The first determining unit is configured to determine the paging range according to the paging indicator information. The sending unit is configured to send the paging range to the core network control plane entity by carrying the paging range in the paging indicator information.

Figure 3:
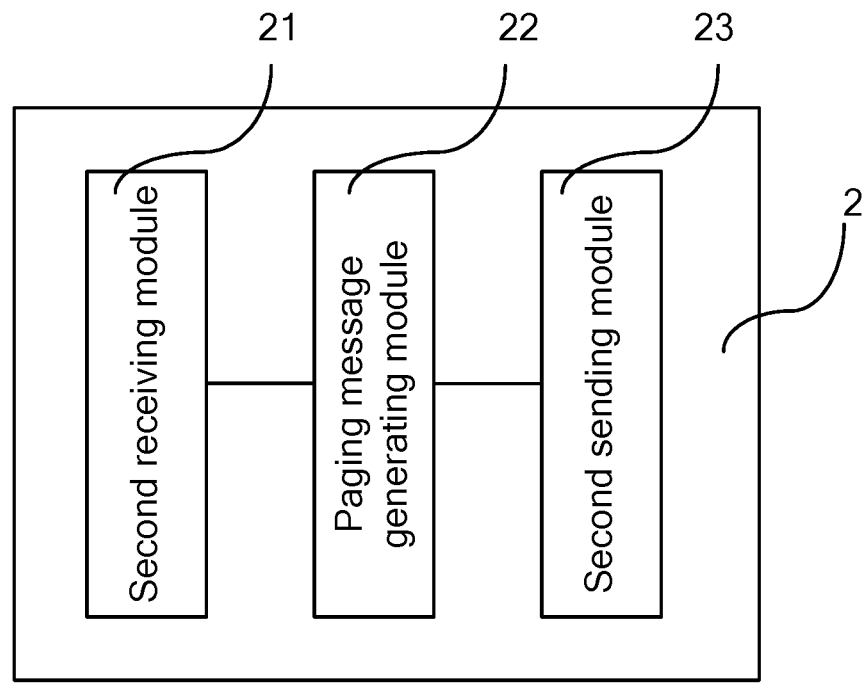
FIG. 3 is a schematic structure diagram of a second embodiment of an apparatus for paging a UE according to an embodiment of the present invention.

The apparatus for paging a UE in the above embodiment of the present invention may be set in the HNB or HNB GW. An embodiment of the present invention further provides an apparatus for paging a UE. FIG. 3 is a schematic structure diagram of the second embodiment of an apparatus for paging a UE according to an embodiment of the present invention. As shown in FIG. 3, the apparatus includes a second receiving module 21, a paging message generating module 22, and a second sending module 23. The second receiving module 21 is configured to receive a downlink data notification message inclusive of paging range indicator information. The paging message generating module 22 is configured to generate a paging message inclusive of a paging range according to the paging range indicator information. The second sending module 23 is configured to send the paging message inclusive of the paging range to the HNB.

The apparatus for paging a UE according to the embodiment of the present invention can determine a paging range according to a received downlink data notification message inclusive of paging range indicator information, and send a paging message inclusive of a paging range, thus controlling the paging range of the UE.

The paging message generating module in the above embodiment of the present invention may include an obtaining unit and a second determining unit. The obtaining unit is configured to obtain paging indicator information in the paging range indicator information in the downlink data notification message, where the paging indicator information includes at least one of the source address information of a downlink packet, destination address of the downlink packet, service type of the downlink packet, APN of the PDN of the downlink data source, and P-GW of the downlink data source. The second determining unit is configured to determine, according to the paging indicator information, that the downlink data comes from the HNB or core network, generate a paging message indicating the paging range is the HNB or user registration area, and send the paging message to the second sending module 23.

In addition, when the paging message includes the downlink data source information, the paging message generating module includes a third determining unit. The third determining unit is configured to: when the second determining unit determines that the downlink data comes from the HNB, determine that the paging range is the HNB according to the HNB ID of the HNB or HNB GW ID included in the paging indicator information, or determine, according to the context information of the UE, the HNB ID of the HNB that the UE is/was attached to, determine that the paging range is the HNB according to the HNB ID, and send the paging message inclusive of the paging range to the second sending module; or the third determining unit is further configured to: when the second determining unit determines that the downlink data comes from the core network, determine that the paging range is the user registration area, and send the paging message inclusive of the paging range to the second sending module.

In addition, the apparatus for paging a UE according to the above embodiment of the present invention may further include a paging recovering module. The paging recovering module is configured to: after the paging initiating module initiates a paging to the UE corresponding to the user ID in the paging range, if no paging response of the UE is received within a preset period of time, determine that the paging range is the user registration area, and page the UE in the user registration area.

Figure 4:
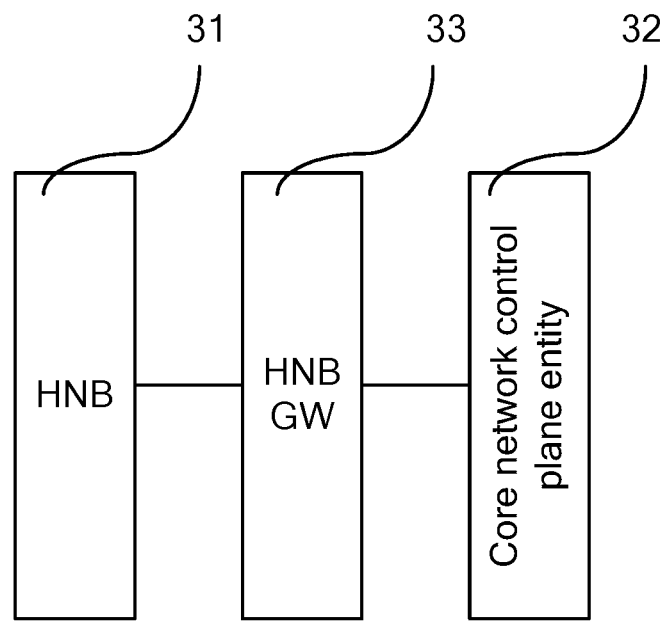
FIG. 4 is a schematic structure diagram of an embodiment of a system for paging a UE according to an embodiment of the present invention.

An embodiment of the present invention further provides a system for paging a UE. FIG. 4 is a schematic structure diagram of an embodiment of a system for paging a UE according to an embodiment of the present invention. As shown in FIG4, the system includes an HNB 31 and a core network control plane entity 32. The HNB 31 is configured to send a downlink data notification message inclusive of paging range indicator information to the core network control plane entity, receive a paging message sent by the core network control plane entity and inclusive of a paging range, and initiate a paging to a UE corresponding to a user ID in the paging range. The core network control plane entity 32 is configured to generate the paging message inclusive of the paging range according to the downlink data notification message and send the paging message.

In the system for paging a UE according to this embodiment, the downlink data notification message sent by the HNB to the core network control plane entity includes paging range indicator information, and the paging range can be determined according to the paging indicator information in the paging range indicator information. Thereby, the UE can be paged in a certain range, system resources are saved, and system loads are reduced.

In addition, the system for paging a UE may further include an HNB GW 33, which is configured to forward the downlink data notification message sent by the HNB to the core network user plane control entity, and after receiving the paging message sent by the core network control plane entity and inclusive of the paging range, send the paging message to the HNB in the paging range.

In addition, the above HNB GW may determine the paging range. Specifically, the HNB GW obtains paging indicator information, where the paging indicator information includes at least one of the source address information of a downlink packet, destination address of the downlink packet, service type of the downlink packet, APN of the PDN of the downlink data source, and P-GW of the downlink data source; and then the HNB GW determines the paging range according to the paging indicator information, and sends the paging range to the core network control plane entity by carrying the paging range in the paging range indicator information.

In addition, the paging range in this embodiment may also be determined by the HNB. When the paging range is determined by the HNB, the HNB obtains paging range information, where the paging range information includes at least one of the source address information of the downlink packet, destination address of the downlink packet, service type of the downlink packet, APN of the PDN of the downlink data source, and P-GW of the downlink data source; and then the HNB determines the paging range according to the paging indicator information, and sends the paging range to the core network control plane entity by carrying the paging range in the paging range indicator information.

When the paging range is determined by the core network control plane entity, the core network control plane entity receives the downlink data notification message, obtains the paging indicator information, and determines the paging range according to the paging indicator information, where the paging indicator information includes at least one of the source address information of the downlink packet, destination address of the downlink packet, service type of the downlink packet, APN of the PDN of the downlink data source, and P-GW of the downlink data source.

In addition, the above core network control plane entity may be configured to send the paging message to all NBs in the UE registration area when no paging response of the UE is received within a preset period of time; if the UE responds to the paging in other NBs than the HNB that receives the downlink data, the core network control plane entity needs to instruct the HNB to forward the downlink data to the NB that receives the paging response of the UE.

Figure 5:
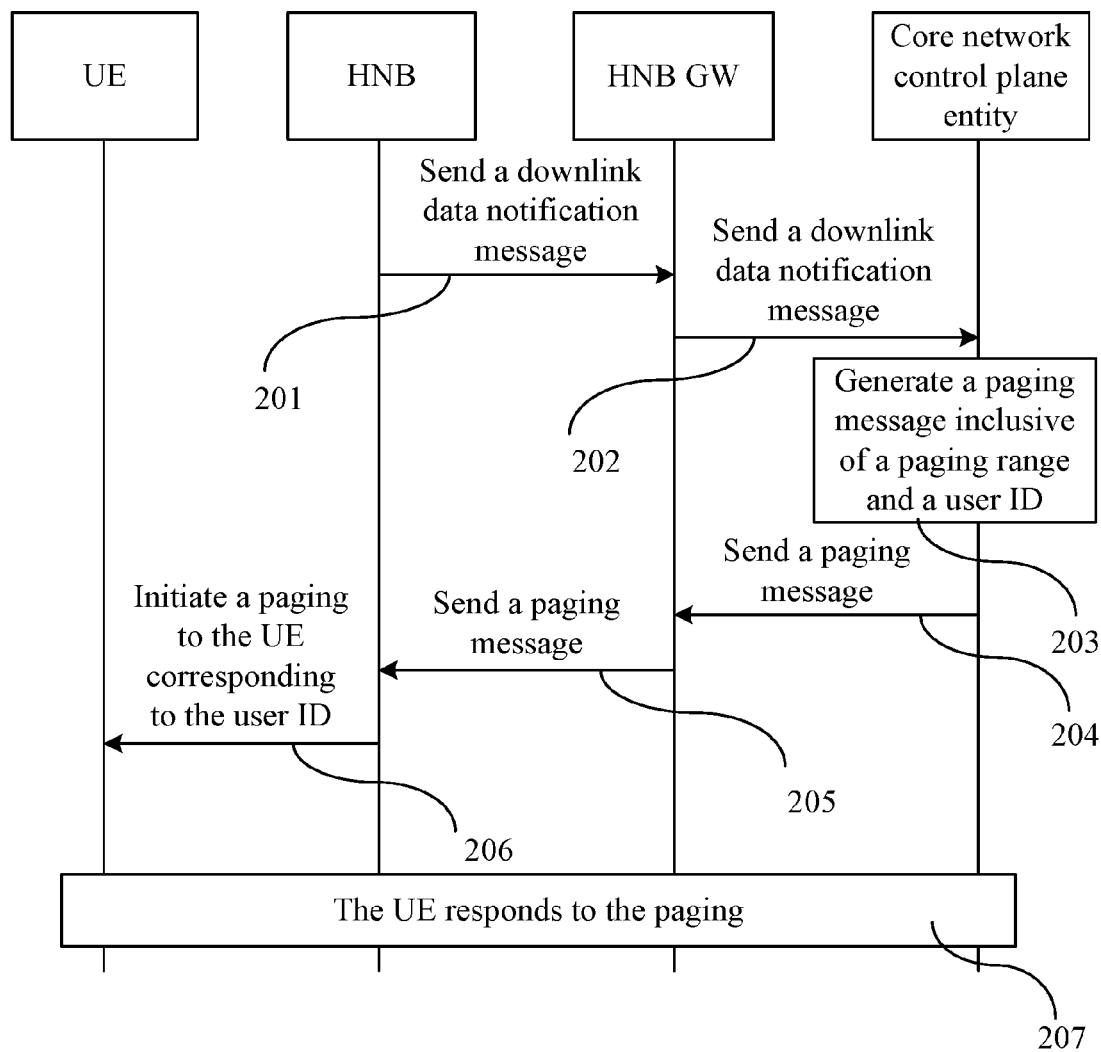
FIG. 5 is a schematic flowchart of a first embodiment of a method for paging a UE according to an embodiment of the present invention.

FIG. 5 is a schematic flowchart of the first embodiment of a method for paging a UE according to an embodiment of the present invention. In this embodiment, the HNB integrates an S-GW; when the UE resides on the HNB, all user data passes through the S-GW of the HNB; when the downlink data of the UE arrives at the HNB, the HNB judges whether the downlink data comes from the core network of a mobile operator or is locally routed from the home network; if the data comes from the home network, the HNB may further determine, according to the source address of the data, whether the data comes from other devices of the home network or from the Internet. As shown in FIG. 5, the method includes the following steps:

Step 201: The HNB sends a downlink data notification message inclusive of paging indicator information to the HNB GW. When no HNB GW is deployed in the system, the HNB may send the downlink data notification message to the core network control plane entity directly, that is, skip step 202. In the system architecture of this embodiment, a complete S4 (for the HNB)/S11 (for the HeNB) interface may exist between the HNB and the core network control plane entity. Through a transaction association context of the interface, the UE may be determined between the HNB and the core network control plane entity. The downlink data notification message may carry paging indicator information used for indicating the paging range.

The paging range in the above paging indicator information may be obtained by the S-GW in the HNB according to information such as the source address and destination address of a packet, or information about whether the downlink packet is sent from the HNB or the P-GW of the core network, or the APN (namely, the ID of the PDN connection) corresponding to the downlink packet. For example, if the downlink packet is sent from the P-GW of the HNB, the paging indicator information indicates a paging in only the HNB, and in this case, carries an HNB ID; if the downlink packet is sent from the P-GW of the core network, the paging indicator information indicates a paging in a macro NB in the range indicated by the user registration area information, HNBs in open and hybrid access modes, and all HNBs in the CSG white list of the user. The paging indicator information may also be the source address and destination address of the downlink data, or data type, APN, service type, APN of the PDN of the data source, information about whether the downlink data is sent from the P-GW of the core network or the P-GW integrated in the HNB, or HNB ID or address. If the HNB is connected to the core network control plane entity through the HNB GW, but the HNB sends the downlink data notification message to the core network control plane entity directly, the paging indicator information may further include the ID or address of the HNB GW. All embodiments of the present invention comply with this principle. The HNB GW or core network control plane entity determines the paging range. In addition, when an incomplete S4 (for the HNB)/S11 (for the HeNB) interface exists between the HNB and the core network control plane entity, the downlink data notification message may further carry a user ID.

Optionally, the HNB determines the paging range according to the paging indicator information, and sends the paging range and the paging indicator information to the HNB GW or core network control plane entity.

Step 202: The HNB GW sends a downlink data notification message to the core network control plane entity, notifying that downlink data arrives. If the message includes paging indicator information, an HNB ID, and a user ID, the HNB GW may carry the information in the downlink data notification message when sending the message to the core network control plane entity. If the downlink data notification message sent from the HNB carries no HNB ID, the HNB GW may determine the HNB ID according to the interface context of the HNB, and add the HNB ID to the downlink data notification message when sending the message to the core network control plane entity. If the Home GW may decide whether to initiate a paging in only the HNB and decide to initiate a paging in the normal area without performing paging optimization, the downlink data notification message sent by the HNB GW to the core network control plane entity may not carry paging indicator information.

Optionally, the HNB GW determines the paging range according to the paging indicator information, and sends the paging range and the paging indicator information to the HNB GW or core network control plane entity.

After receiving a downlink data notification response message sent by the core network control plane entity, the HNB GW sends a downlink data notification response message to the HNB, where the message may be sent out immediately after the HNB GW receives the downlink data notification message.

Step 203: The core network control plane entity generates a paging message inclusive of a paging range and a user ID. After receiving the downlink data notification message, the core network control plane entity searches for the stored context information of the user, and determines the paging range according to the paging indicator information, HNB ID, user ID, APN, network configuration, operator policy, and service continuity of local routing subscribed by the user. If the paging range is the HNB, the core network control plane entity determines that the paging message is sent to only the HNB or HNB GW that sends the downlink data notification message for triggering the paging.

When the core network control plane entity receives the downlink data notification message correctly, the core network control plane entity may send a downlink data notification response message.

Step 204: If the HNB GW is deployed in the network, the core network control plane entity sends the paging message to the HNB GW (if the downlink data notification message is sent by the HNB to the core network control plane entity directly, the HNB is found according to the ID or address of the HNB GW carried in the paging indicator information, and the same applies to all the embodiments of the present invention) determined in step 703, where the message carries user ID information. If the paging range is the HNB, the message may further carry an HNB ID or carry information indicating that the paging message is sent to only the HNB where the downlink data arrives. According to the ID of the HNB to which the user is attached lately, the core network control plane entity may send the paging message to the HNB GW connected to the HNB, where the ID of the HNB is stored in the UE context, and the UE context may include an ID of the HNB GW. If no HNB GW is deployed in the network, the paging message is directly sent to the HNB, and step 205 is skipped.

Step 205: After receiving the paging message, the HNB GW sends a paging message to the controlled HNB. If the paging message carries an HNB ID, the HNB GW sends a paging message to only the HNB indicated by the HNB ID. If the paging message carries an indicator to indicate that the paging is sent to only the HNB where the downlink data arrives, the HNB GW determines, according to the user ID and context information, the HNB where the downlink data arrives, and sends the paging message to only the HNB.

Step 206: The HNB that receives the paging message initiates a paging to the UE corresponding to the user ID.

Step 207: After receiving the paging, the UE initiates a service request to respond to the paging. In this step, if the UE does not respond to the paging within a period of time, the core network control plane entity may initiate PDN connection deactivation to release the PDN connection of the local route.

Figure 6:
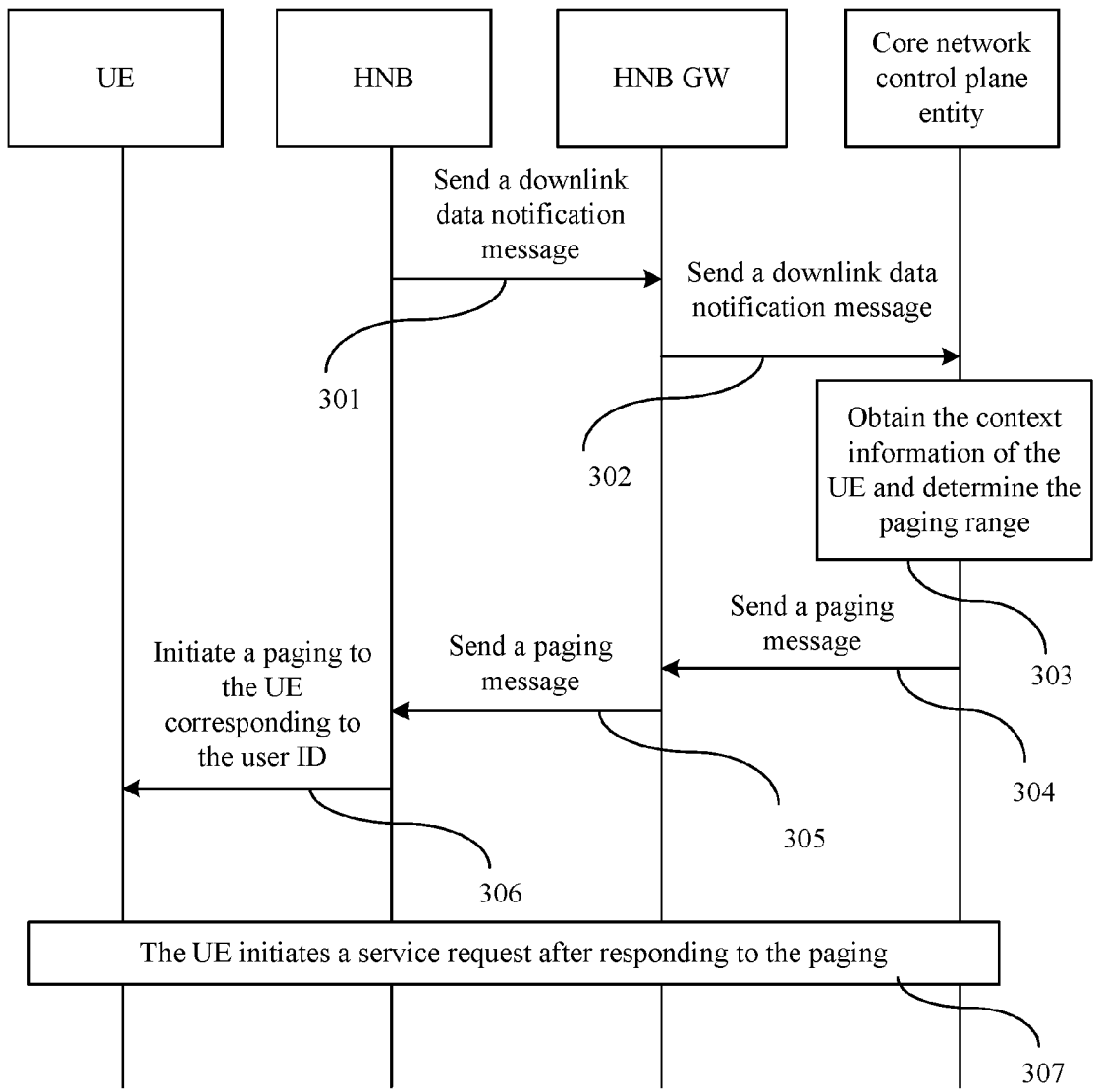
FIG. 6 is a schematic flowchart of a second embodiment of a method for paging a UE according to an embodiment of the present invention.

FIG. 6 is a schematic flowchart of the second embodiment of a method for paging a UE according to the present invention. As shown in FIG. 6, in this embodiment, the HNB integrates an S-GW; when the UE resides on the HNB, all user data passes through the S-GW of the HNB; when the downlink data of the UE arrives at the HNB, the HNB judges whether the downlink data comes from the core network of a mobile operator or is locally routed from the home network; if the data comes from the home network, the HNB may further determine, according to the source address of the data, whether the data comes from other devices of the home network or from the Internet. The method includes the following steps:

Step 301: The HNB sends a downlink data notification message inclusive of paging indicator information to the HNB GW. When no HNB GW is deployed in the system, the HNB may send the downlink data notification message to the core network control plane entity directly, that is, skip step 302.

In the system architecture of this embodiment, a complete S4 (for the HNB)/S11 (for the HeNB) interface may exist between the HNB and the core network control plane entity. Through a transaction association context of the interface, the UE may be determined between the HNB and the core network control plane entity. The downlink data notification message may carry paging indicator information used for indicating the paging range, and may further carry an HNB ID.

The paging range in the above paging indicator information may be obtained by the S-GW in the HNB according to information such as the source address and destination address of a packet, or information about whether the downlink packet is sent from the HNB or the P-GW of the core network, where the downlink packet corresponds to the APN, a connection bearer ID of the PDN connection. For example, if the downlink packet is sent from the P-GW of the HNB, the paging indicator information indicates a paging in only the HNB; if the downlink packet is sent from the P-GW of the core network, the paging indicator information indicates a paging in a macro NB in the range indicated by the user registration area information, HNBs in open and hybrid access modes, and all HNBs in the CSG white list of the user. The paging range information may indicate only the source address and destination address of the downlink data, or data type, and the HNB GW or core network control plane entity determines the paging range. In addition, when an incomplete S4 (for the HNB)/S11 (for the HeNB) interface exists between the HNB and the core network control plane entity, the downlink data notification message may further carry a user ID.

Optionally, the HNB determines the paging range according to the paging indicator information, and sends the paging range and the paging indicator information to the HNB GW or core network control plane entity.

Step 302: The HNB GW sends a downlink data notification message to the core network control plane entity, notifying that downlink data arrives, where the downlink data notification message may include paging indicator information, an HNB ID, and a user ID. If the downlink data notification message sent from the HNB carries no HNB ID, the HNB GW may determine the HNB ID according to the interface context of the HNB, and add the HNB ID to the downlink data notification message when sending the message to the core network control plane entity. According to different implementation solutions, if the HNB GW may decide whether to initiate a paging only in the HNB, the downlink data notification message sent by the HNB GW to the core network control plane entity may not carry paging indicator information.

Optionally, the HNB GW determines the paging range according to the paging indicator information, and sends the paging range and the paging indicator information to the HNB GW or core network control plane entity.

In addition, when the core network control plane entity receives the downlink data notification message correctly, the core network control plane entity may send a downlink data notification response message to the HNB GW.

After receiving the downlink data notification response message sent by the core network control plane entity, the HNB GW sends a downlink data notification response message to the HNB, where the message may be sent out immediately after the HNB GW receives the downlink data notification message.

Step 303: After receiving the downlink data notification message, the core network control plane entity searches for the stored context information of the UE, paging indicator information, HNB ID, and user ID according to the destination address of the above downlink data and UE ID, and determines the paging range. If the paging range is the HNB, the core network control plane entity determines that a paging message is sent to only the HNB or HNB GW that sends the downlink data notification message for triggering the paging.

Step 304: If the HNB GW is deployed in the network, the core network control plane entity sends a paging message to the HNB GW, where the message carries user ID information. If the paging range is the HNB, the message needs to further carry an HNB ID. According to the ID of the HNB to which the user is attached lately, the core network control plane entity may send the paging message to the HNB GW connected to the HNB, where the ID of the HNB is stored in the UE context, and the UE context may include an ID of the HNB GW. If no HNB GW is deployed in the network, the paging is directly sent to the HNB, and step 305 is skipped.

Step 305: After receiving the paging message, the HNB GW sends a paging message to the controlled HNB. If the paging message carries an HNB ID, the HNB GW sends a paging message to the HNB indicated by the HNB ID; if the paging message carries an indicator to indicate that the paging is sent to only the HNB where the downlink data arrives, the HNB GW determines, according to the user ID and context information, the HNB where the downlink data arrives, and sends the paging message to the HNB.

Step 306: The HNB that receives the paging message initiates a paging to the UE corresponding to the user ID.

If the paging message is sent to a specified HNB or all HNBs controlled by the HNB GW are paged, and the UE does not respond to the paging within a period of time, that is, the timer set by the core network control plane entity expires, the core network control plane entity may decide to perform a paging in a macro NB in the range indicated by the user registration area information, HNBs in open and hybrid access modes, and all HNBs in the CSG white list of the user. The timer may also be set in the HNB. If no paging response is received after the timer in the HNB expires, the HNB initiates a downlink data notification message to the core network control plane entity or HNB GW again, where the message may carry indicator information indicating a paging in the whole user registration area or carry indicator information indicating that no UE paging response is received; the HNB GW forwards the downlink data notification message to the core network control plane entity, instructing the core network control plane entity to perform a paging in all NBs in the user registration area. The timer may also be set in the HNB GW. If no paging response is received after the timer expires, the HNB GW initiates a downlink data notification message to the core network control plane entity, where the message carries paging indicator information instructing the core network control plane entity to perform a paging in the user registration area.

If the UE responds to the paging in other NBs, and the core network management entity selects a new S-GW and updates the PDN connection path in the core network, the core network control plane entity may notify the HNB, and instruct the HNB whether to forward the downlink data to the S-GW in the HNB where the UE responds to the paging or the S-GW of the core network. Or the HNB decides to discard data or responds to the core network control plane entity to decide to forward data. After data forwarding is complete, if service continuity of local routing does not need to be reserved, the network may initiate deactivation of the PDN connection of the local route. If all downlink data sources are locally routed, and the service continuity of local routing does not need to be reserved, the network may also decide not to forward data, and the network initiates deactivation of the PDN connection of the local route.

Step 307: After receiving the paging, the UE initiates a service request to respond to the paging.

Figure 7:
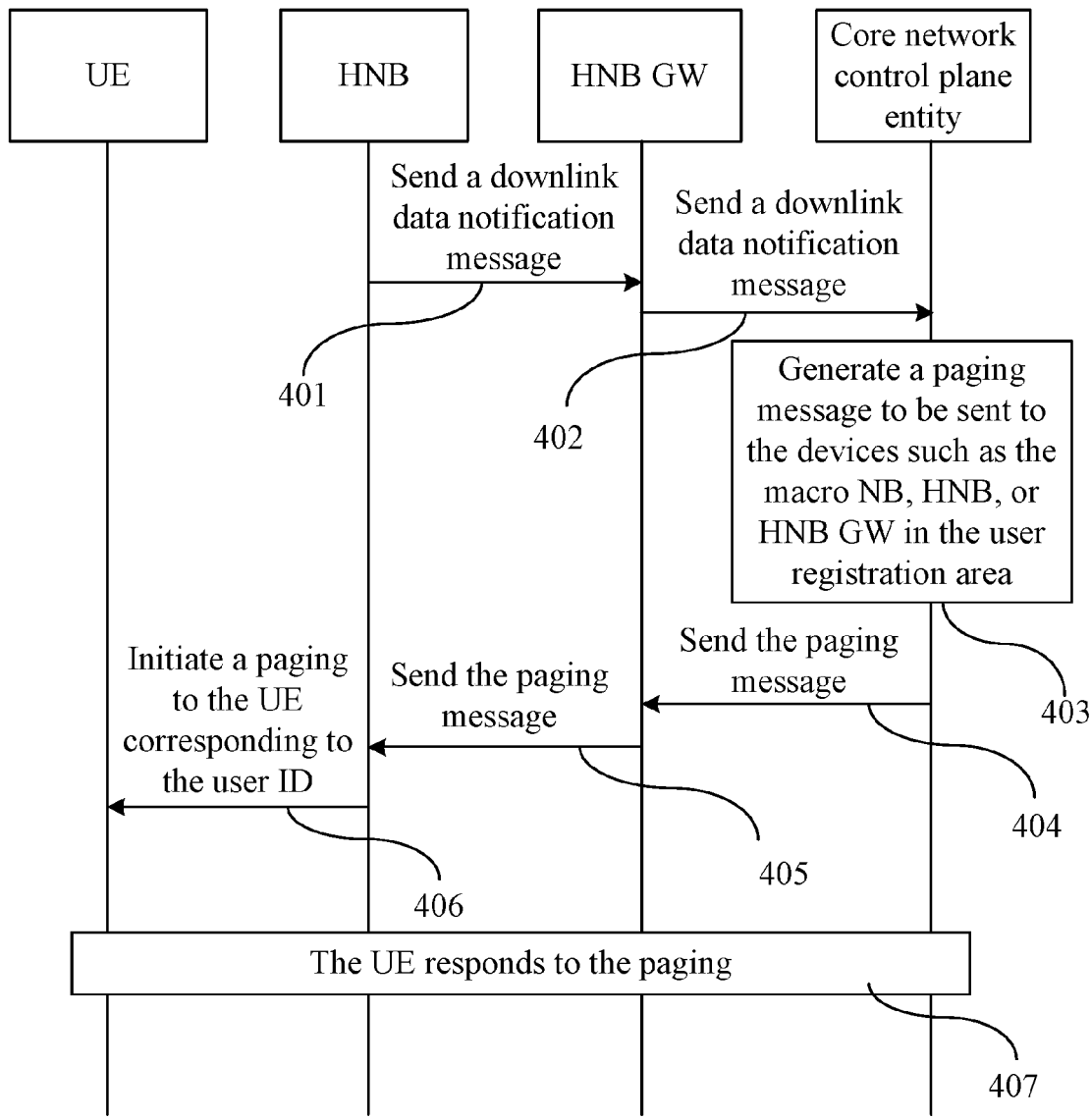
FIG. 7 is a schematic flowchart of a third embodiment of a method for paging a UE according to an embodiment of the present invention.

FIG. 7 is a schematic flowchart of the third embodiment of a method for paging a UE according to the present invention. As shown in FIG. 7, in this embodiment, the HNB integrates an S-GW; when the UE resides on the HNB, all user data passes through the S-GW of the HNB; when the downlink data of the UE arrives at the HNB, the HNB judges whether the downlink data comes from the core network of a mobile operator or is locally routed from the home network; if the data comes from the home network, the HNB may further determine, according to the source address of the data, whether the data comes from other devices of the home network or from the Internet. The method includes the following steps:

Steps 401 and 402 in this embodiment are the same as steps 301 and 302 in the above embodiment.

Step 403: After receiving the downlink data notification message, the core network control plane entity searches for the stored context information of the UE according to the paging indicator information, HNB ID, and user ID, and determines the paging range.

The core network control plane entity may determine that the paging range is the user registration area according to UE subscription, APN and other network configurations, and information which indicates that the data source is core network data and that the data type is emergency.

If the paging range is a user registration area, the core network control plane entity determines to generate a paging message to be sent to the devices such as the macro NB, HNB, or HNB GW in the user registration area.

Step 404: The core network control plane entity sends the paging message to the devices such as the macro NB, HNB, or HNB GW in the user registration area, where the message carries user ID information.

Step 405: After receiving the paging message, the HNB GW sends a paging message to all controlled HNBs.

Step 406: The HNB that receives the paging message initiates a paging to the UE corresponding to the user ID, and similarly, the macro NB that receives the paging message also initiates a paging.

Step 407: After receiving the paging, the UE initiates a service request to respond to the paging.

If the user responds to the paging in the HNB where the downlink data arrives, the core network control plane entity notifies the HNB to send the cached downlink data to the user.

If the user responds to the paging in other NBs, the core network control plane entity may notify the HNB and instruct the HNB to forward the data to the NB where the user responds to the paging. Or according to the cached data source or bearer QoS, the HNB decides to discard data or responds to the core network control plane entity to decide to forward data.

Figure 8:
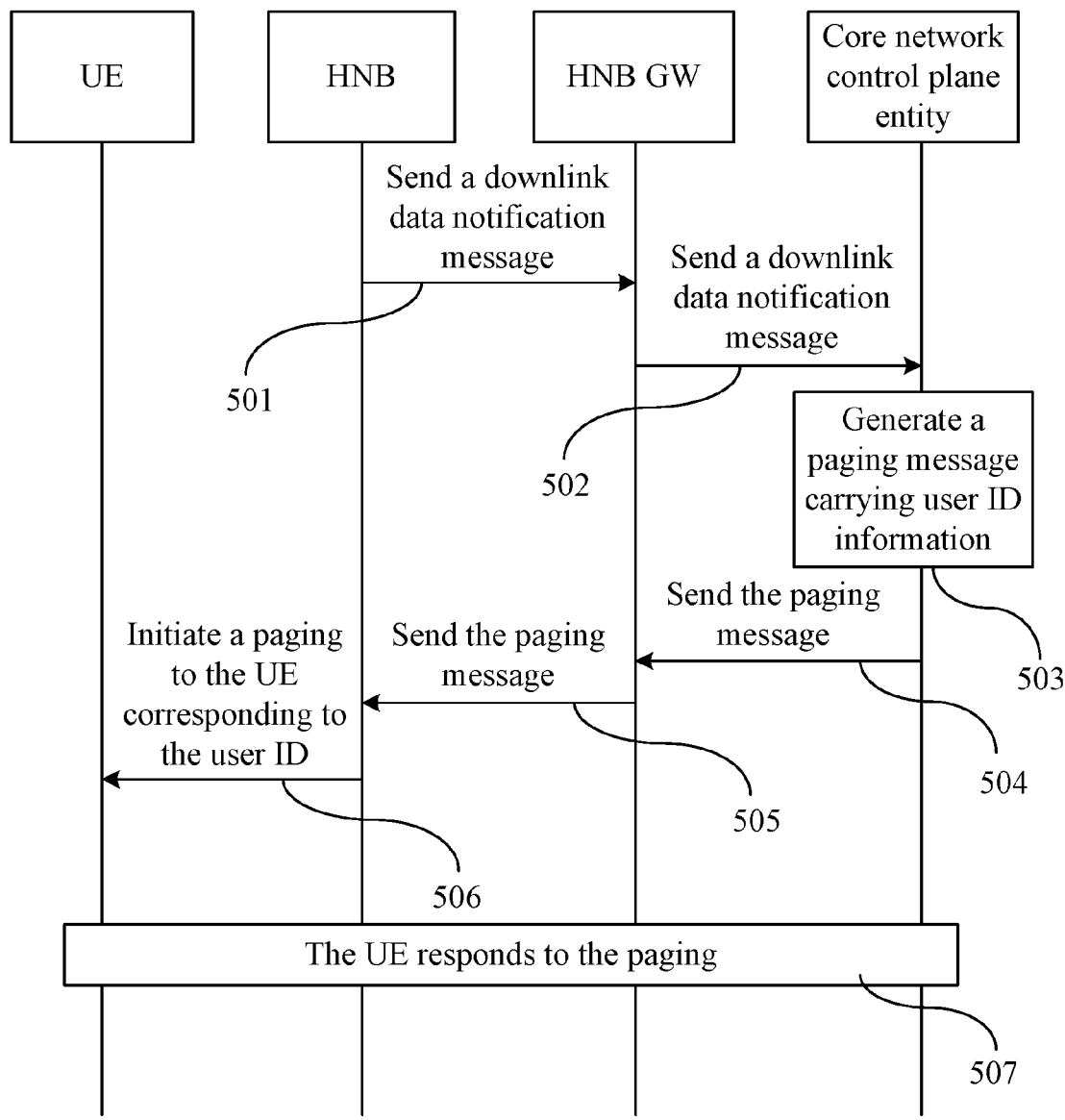
FIG. 8 is a schematic flowchart of a fourth embodiment of a method for paging a UE according to an embodiment of the present invention.

FIG. 8 is a schematic flowchart of the fourth embodiment of a method for paging a UE according to the present invention. In this embodiment, an S-GW is set in both the HNB and the core network (for the UMIS HNB, the corresponding core network control plane entity is an SGSN, and if the UMTS HNB accesses the LTE core network, the control plane entity on the UMTS HNB is an S-GW); when the UE resides on the HNB, the user data locally routed passes through the S-GW/P-GW on the HNB; the core network data passes through the S-GW/UMTS in the core network. In this embodiment, the downlink user data arrives at the HNB, and the HNB learns that the data is locally routed from the home network, and may determine, according to the source address of the data, whether the data comes from other devices of the home network or from the Internet. As shown in FIG. 8, the method includes the following steps:

Step 501: The HNB sends a downlink data notification message inclusive of paging indicator information to the HNB GW. When no HNB GW is deployed in the system, the HNB may send the downlink data notification message to the core network control plane entity directly, that is, skip step 502. In this step, complete Gn (HNB)/S4 (HNB)/S11 (HeNB) interface protocol stacks may exist between the HNB and the core network control plane entity. Through a transaction association context of the interface, the UE may be determined between the HNB and the core network control plane entity. The downlink data notification message may carry the HNB ID. If an incomplete Gn (HNB)/S4 (HNB)/S11 (HeNB) interface protocol stack exists between the HNB and the core network control plane entity, the downlink data notification message may further carry a user ID.

Step 502: The HNB GW sends a downlink data notification message to the core network control plane entity. If the downlink data notification message includes an HNB ID and a user ID, the HNB GW may carry the information in the downlink data notification message when sending the message to the core network control plane entity. If the downlink data notification message sent from the HNB carries no HNB ID, the HNB GW may determine the HNB ID according to the interface context of the HNB, and add the HNB ID to the downlink data notification message when sending the message to the core network control plane entity.

In addition, when the core network control plane entity receives the downlink data notification message correctly, the core network control plane entity may send a downlink data notification response message to the HNB GW.

After receiving the downlink data notification response message sent by the core network control plane entity, the HNB GW sends a downlink data notification response message to the HNB, where the message may be sent out immediately after the HNB GW receives the downlink data notification message.

Step 503: After receiving the downlink data notification message, the core network control plane entity finds the stored context information of the UE according to the HNB ID and user ID, and determines the paging range.

If the paging range is the HNB, the core network control plane entity determines that a paging message is sent to only the HNB or HNB GW that sends the downlink data notification message for triggering the paging, and the core network control plane entity generates a paging message carrying user ID information.

Step 504 (optional): If the HNB GW is deployed in the network, the core network control plane entity sends a paging message to the HNB GW, where the message carries user ID information. If the paging range is the HNB, the message needs to further carry an HNB ID. According to the ID of the HNB to which the user is attached lately, the core network control plane entity may send the paging message to the HNB GW connected to the HNB, where the ID of the HNB is stored in the UE context, and the UE context may include an ID of the HNB GW. If no HNB GW is deployed in the network, the paging is directly sent to the HNB, and step 505 is skipped.

Step 505: After receiving the paging message, the HNB GW sends a paging message to the controlled HNB. If the paging message carries an HNB ID, the HNB GW sends a paging message to only the HNB indicated by the HNB ID.

Step 506: The HNB that receives the paging message initiates a paging.

Step 507: After receiving the paging, the UE initiates a service request to respond to the paging.

If the UE does not respond to the paging within a period of time, the core network control plane entity may initiate PDN connection deactivation to release the PDN connection of the local route.

In addition, in step 506 of the above embodiment, if the paging is initiated to the specified HNB or all HNBs controlled by the HNB GW are paged, and the UE does not respond to the paging within a period of time, the core network control plane entity may further continue to initiate a paging in a macro NB in the range indicated by the user registration area information, HNBs in open and hybrid access modes, and all HNBs in the CSG white list of the user.

If the NB where the UE responds to the paging is not the HNB that receives the downlink data, the core network control plane entity may notify the HNB that receives the above downlink data, and instruct the HNB to forward the data to the NB where the UE responds to the paging. Or the HNB decides to discard the data or responds to the core network control plane entity to decide to forward the data; after data forwarding is complete, the network initiates deactivation of the PDN connection of the local route and the PDN connection carrying the core network data continues to use the S-GW in the core network. The network may also decide not to forward the data. The network initiates deactivation of the PDN connection of the local route, and the PDN connection carrying the core network data continues to use the S-GW/SGSN in the core network.

Figure 9:
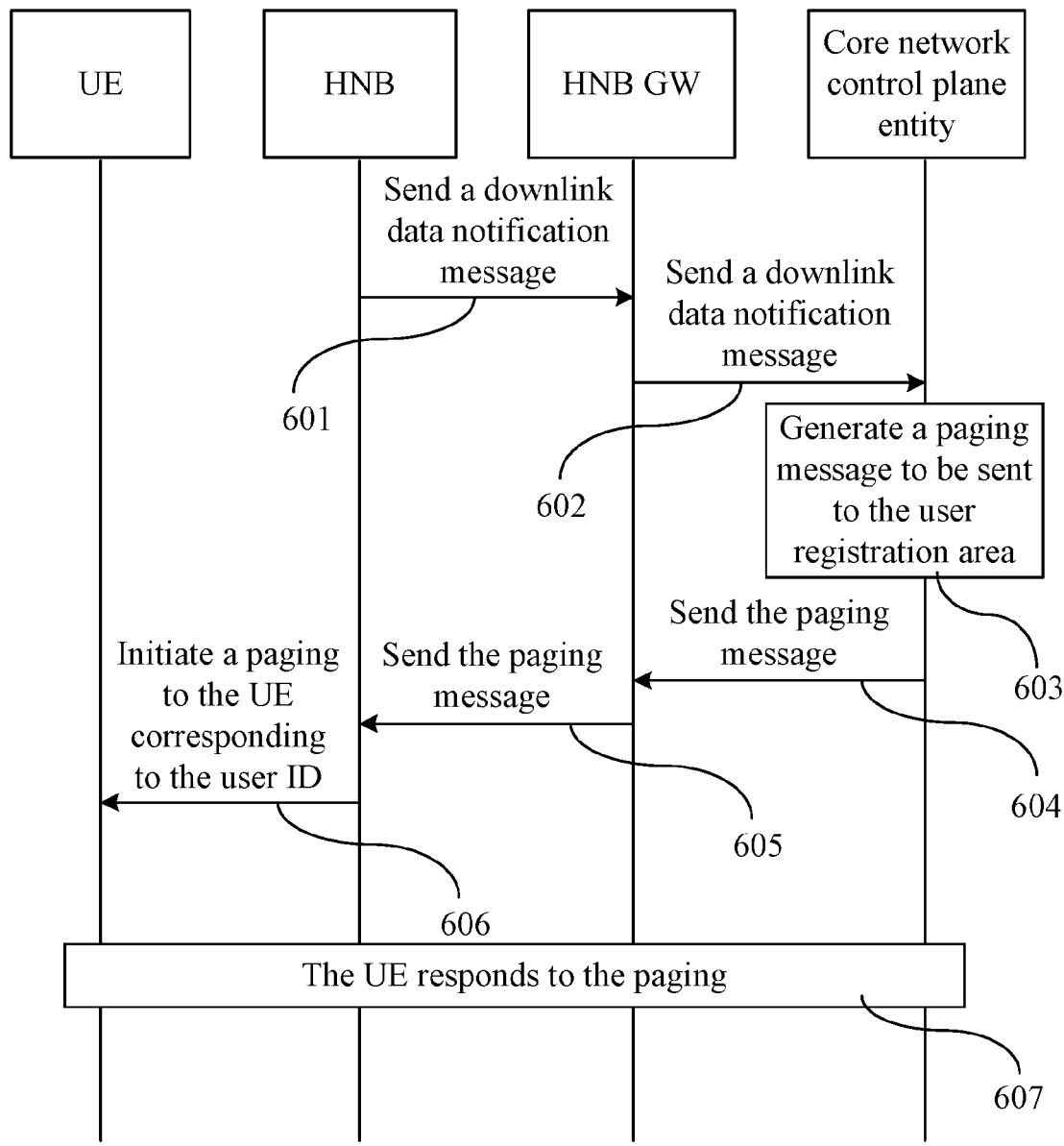
FIG. 9 is a schematic flowchart of a fifth embodiment of a method for paging a UE according to an embodiment of the present invention.

FIG. 9 is a schematic flowchart of the fifth embodiment of a method for paging a UE according to the present invention. In this embodiment, an S-GW is set in both the HNB and the core network (for the UMTS HNB, the corresponding core network control plane entity is an SGSN, and if the UMTS HNB accesses the LTE core network, the control plane entity on the UMTS HNB is an S-GW; when the UE resides on the HNB, the user data locally routed passes through the S-GW/SGSN on the HNB; the core network data passes through the S-GW/SGSN in the core network. In this embodiment, the downlink user data arrives at the HNB, and the HNB learns that the data is locally routed from the home network, and may determine, according to the source address of the data, whether the data comes from other devices of the home network or from the Internet. As shown in FIG. 9, the method includes the following steps:

Steps 601 and 602 in this embodiment are the same as steps 501 and 502 in the embodiment shown in FIG. 8.

Step 603: After receiving the downlink data notification message, the core network control plane entity finds the stored context information of the user according to the HNB ID and user ID, and determines the paging range.

The core network control plane entity may determine that the paging range is the user registration area according to user subscription, APN and other network configurations, and information which indicates that the data source is core network data and that the data type is emergency.

If the paging range is a user registration area, the core network control plane entity determines that a paging message is sent to the devices such as the macro NB, HNB, or HNB GW in the user registration area, and therefore generates a paging message to be sent to the user registration area.

Step 604: The core network control plane entity sends the paging message to the devices such as the macro NB, HNB, or HNB GW in the user registration area, where the message carries user ID information.

Step 605: After receiving the paging message, the HNB GW sends a paging message to all controlled HNBs.

Step 606: The HNB that receives the paging message initiates a paging, and similarly, the macro NB that receives the paging message also initiates a paging.

Step 607: After receiving the paging, the UE initiates a service request to respond to the paging.

If the UE responds to the paging in the HNB where the downlink data arrives, the core network control plane entity notifies the HNB to send the cached downlink data to the UE.

If the UE responds to the paging in other NBs, the core network control plane entity may notify the HNB and instruct the HNB to forward the data to the NB where the user responds to the paging. Or according to the cached data source or bearer QoS, the HNB decides to discard data or responds to the core network control plane entity to decide to forward data.

Figure 10:
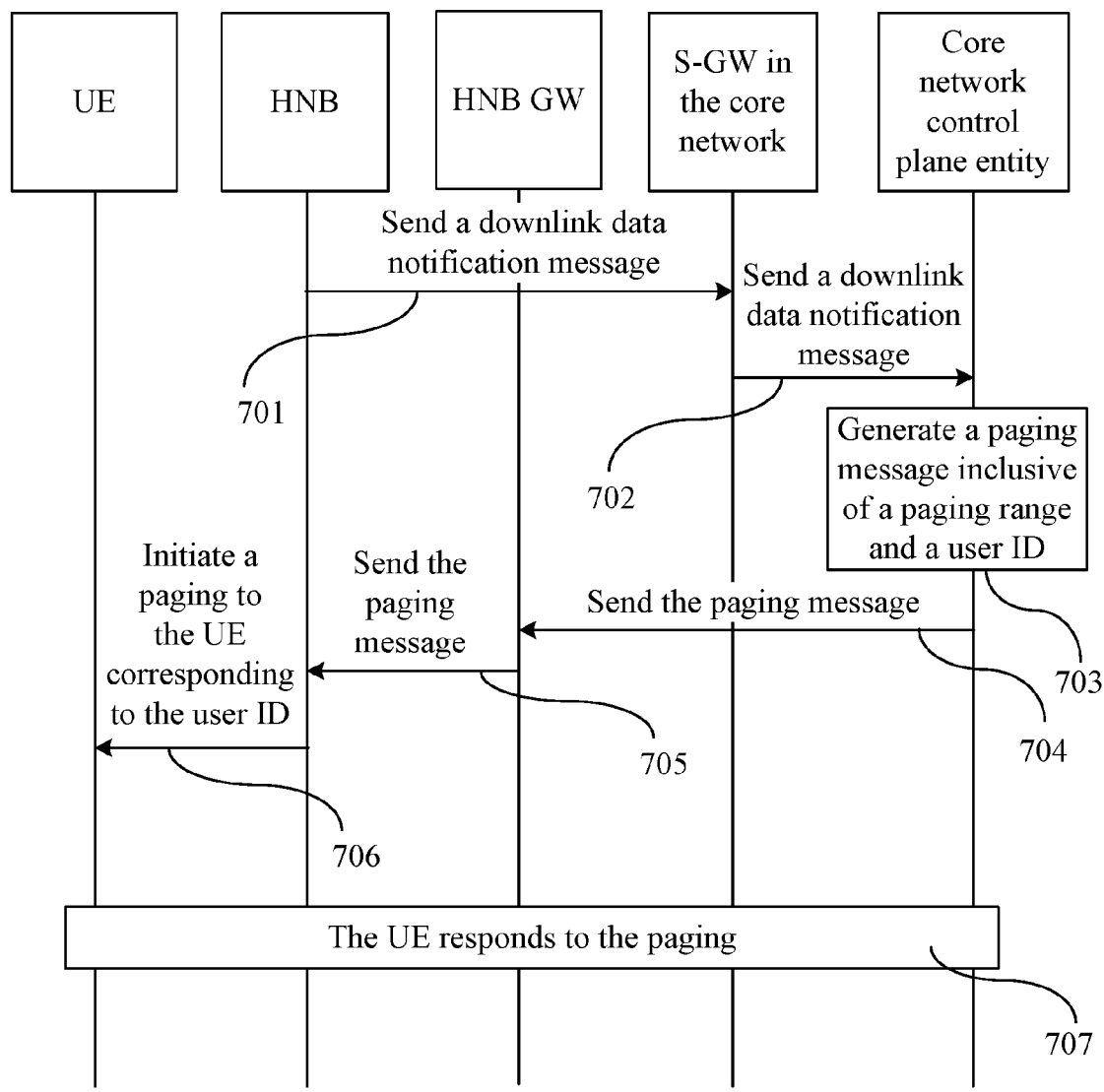
FIG. 10 is a schematic flowchart of a sixth embodiment of a method for paging a UE according to an embodiment of the present invention.

FIG. 10 is a schematic flowchart of the sixth embodiment of a method for paging a UE according to the present invention. In this embodiment, the HNB is not integrated with an S-GW; when the UE resides on the HNB, all user data passes through the P-GW integrated in the HNB and is sent to the HNB directly; when the downlink data of the UE arrives at the P-GW of the HNB, the P-GW of the HNB sends the data to the S-GW of the core network. The S-GW of the core network judges, according to the P-GW of the downlink data source and connection port, whether the downlink data comes from the core network of a mobile operator or is locally routed from the home network; if the downlink data comes from the home network, the S-GW of the core network may further determine, according to the source address of the data, whether the downlink data comes from other devices of the home network or from the Internet. The S-GW of the core network may judge, according to the downlink data source, whether to send a downlink data notification to the core network control plane entity. The downlink data notification sent by the S-GW of the core network to the core network control plane entity may carry the paging indicator information generated by the S-GW. The core network control plane entity decides, according to the paging indicator information, user subscription, operator configuration, and APN, whether to send a paging message to the HNB or HNB GW. As shown in FIG. 10, the method includes the following steps:

Step 701: The HNB sends downlink data to the S-GW of the core network. In the system architecture of this embodiment, a complete S5 interface may exist between the HNB and the core network control plane entity. Through a transaction association context of the interface, the UE may be determined between the HNB and the core network control plane entity. The P-GW integrated in the HNB may carry the paging indicator information used to indicate a paging range when, before, or after sending the downlink data to the S-GW, where the paging indicator may carry an HNB ID or address, and may further carry a HNB GW ID or address if an HNB GW is deployed in the network.

The paging range in the above paging indicator information may be obtained by the P-GW in the HNB according to information such as the source address and destination address of a packet, or the APN (namely, the ID of the PDN connection) corresponding to the downlink packet. When an incomplete S5 interface exists between the HNB and the S-GW of the core network, the P-GW integrated in the HNB may further carry a user ID when sending the downlink data.

Optionally, the HNB determines the paging range according to the paging indicator information, and sends the paging range and the paging indicator information to the HNB GW or core network control plane entity.

Step 702: The S-GW of the core network sends a downlink data notification message to the core network control plane entity, notifying that downlink data arrives, where the message may include paging indicator information and a user ID.

The paging range may be obtained by the S-GW of the core network according to information such as the source address and destination address of the packet included in the above paging indicator information, or information about whether the downlink packet is sent from the HNB or the P-GW of the core network, or the APN (namely, the ID of the PDN connection) corresponding to the downlink packet. For example, if the downlink packet is sent from the P-GW of the HNB, the paging indicator information indicates a paging in only the HNBs in open and hybrid access modes in the user registration area and all HNBs in the CSG white list of the user. If the downlink packet is sent from the P-GW of the core network, the paging indicator information indicates a paging in a macro NB in the range indicated by the user registration area information, HNBs in open and hybrid access modes, and all HNBs in the CSG white list of the user. The paging indicator information may also include at least one of the following: the source address and destination address of the downlink data, data type, APN, service type, APN of the PDN of the data source, and information about whether the downlink data is sent from the P-GW of the core network or the P-GW integrated in the HNB. If the HNB is connected to the core network control plane entity through the HNB GW, but the HNB sends the ID or address of the HNB, or the ID or address of the HNB GW to the S-GW of the core network, the paging indicator information needs to further include the ID or address of the HNB, or the ID or address of the GNB GW. The S-GW of the core network may also obtain the address of the HNB or HNB GW from the IP link. All the information may be sent to the core network control plane entity as paging indicator information.

The core network control plane entity sends a downlink data notification response message to the S-GW of the core network.

Step 703: The core network control plane entity generates a paging message inclusive of a paging range and a user ID. After receiving the downlink data notification message, the core network control plane entity searches for the stored context information of the user, and determines the paging range by using at least one of the following as the paging range indicator: the paging indicator information, HNB ID, user ID, APN, network configuration, operator policy, and service continuity of local routing subscribed by the user.

If the paging range is the HNB, no HNB GW is deployed in the network, and the core network control plane entity obtains the ID or address of the HNB from the S-GW, the core network control plane entity determines that the paging message may be sent to only the HNB that sends the downlink data notification message for triggering the paging. If the paging range is the HNB, an HNB GW is deployed in the network, and the core network control plane entity obtains the ID or address of the HNB GW from the S-GW, the core network control plane entity determines that the paging message may be sent to only the HNB GW that sends the downlink data notification message for triggering the paging. If the paging range is the HNB, an HNB GW is deployed in the network, and the core network control plane entity obtains IDs or addresses of the HNB and HNB GW from the S-GW, the core network control plane entity determines that the paging message may be sent to only the HNB GW that sends the downlink data notification message for triggering the paging, where the downlink data notification message carries an ID or address of the HNB. If the paging range is the HNB, an HNB GW is deployed in the network, and the core network control plane entity obtains no IDs or addresses of the HNB and HNB GW from the S-GW, the core network control plane entity determines that the paging message is sent to the HNBs in open and hybrid access modes in the user registration area and all HNBs in the CSG white list of the user to page the user.

Step 704: If the HNB GW is deployed in the network, the core network control plane entity sends the paging message to the HNB GW (if the downlink data notification message is sent by the HNB to the core network control plane entity directly, the HNB is found according to the ID or address of the HNB GW carried in the paging indicator information) determined in step 703, where the message carries user ID information. If the paging range is the HNB, but no specific ID or address of the HNB is available, the message may further carry a user registration area list and a CSG white list of the user and indicates a paging in all HNBs in open and hybrid access modes in the above area. According to the ID of the HNB to which the user is attached lately, the core network control plane entity may send the paging message to the HNB GW connected to the HNB, where the ID of the HNB is stored in the UE context, and the UE context may include an ID of the HNB GW. If no HNB GW is deployed in the network, the paging is directly sent to the HNB, and step 705 is skipped.

Step 705: After receiving the paging message, the HNB GW sends a paging message to the controlled HNB. If the paging message carries an HNB ID, the HNB GW sends a paging message to only the HNB indicated by the HNB ID. If the paging message carries an indicator to indicate that the paging message is sent to only the HNB where the downlink data arrives, the HNB GW determines, according to the user ID and context information, the HNB where the downlink data arrives, and sends the paging message to only the NB.

Step 706: The HNB that receives the paging message initiates a paging to the UE corresponding to the user ID.

Step 707: After receiving the paging, the UE initiates a service request to respond to the paging. In this step, if the UE does not respond to the paging within a period of time, the core network control plane entity may initiate PDN connection deactivation to release the PDN connection of the local route.

If the user subscription, operator policy or configuration, and PDN connection sending the user data support service continuity of local routing, and the paging message is sent to a specified HNB or all HNBs controlled by the HNB GW are paged, and the UE does not respond to the paging within a period of time, that is, the timer set by the core network control plane entity expires, the core network control plane entity may decide to perform a paging in a macro NB in the range indicated by the user registration area information, HNBs in open and hybrid access modes, and all HNBs in the CSG white list of the user. The timer may also be set in the HNB. If no paging response is received after the timer in the HNB expires, the HNB initiates a downlink data notification message to the core network control plane entity or HNB GW again, where the message may carry indicator information indicating a paging in the whole user registration area or carry indicator information indicating that no UE paging response is received; the HNB GW forwards the downlink data notification message to the core network control plane entity, instructing the core network control plane entity to perform a paging in all NBs in the user registration area. The timer may also be set in the HNB GW. If no paging response is received after the timer expires, the HNB GW initiates a downlink data notification message to the core network control plane entity, where the message carries paging indicator information instructing the core network control plane entity to perform a paging in the user registration area.

In the above embodiments, an HNB GW is set in the system, but some messages exchanged between the HNB and the core network control plane entity may be sent directly to the control plane entity or HNB through IP routing, or may be routed directly through the HNB GW. In this case, the HNB GW does not process the messages. In addition, in the LTE system, the HNB GW is optional, that is, the HNB GW may not exist; in this case, the HNB and the core network control plane entity are connected directly, and transmit and process various messages mutually. The specific flowchart is similar to those in the above embodiments. In embodiments of the present invention, the method for setting up the IP address of the UE, user ID, user registration area information, and CSG list information of the user in the HNB GW includes the following steps:

The HNB GW needs to perform NAT processing when routing data locally, and in this case, the mapping relationship between the user IP address and the address and port of the HNB GW is recorded.

When establishing a user plane connection between the core network control plane entity and the HNB GW, the core network control plane entity receives the user ID, user registration area information (TAI list), and CSG list information of the user. When the core network control plane entity triggers releasing of the link, the HNB GW stores the above information of the user, or, when the core network control plane entity triggers releasing of the link, the HNB GW keeps the signaling link with the core network control plane entity, and releases only the link between the HNB GW and the HNB.

In addition, the above method is applicable to the case that the HNB creates UE contexts. When the HNB activates local switching, the core network control plane entity sends information such as the user ID to the HNB GW, and the HNB GW sends the above information to the HNB. The user ID may be a permanent ID (IMSI) or a temporary ID (S-TMSI or GUTI). If the ID notified by the core network control plane entity to the HNB GW is an IMSI, the core network control plane entity may send the parameter when creating the S1 connection message of the user for the first time. If the ID notified to the HNB GW is an S-TMSI or a GUTI, the message may carry the parameter every time, or the message may carry the parameter only when parameters are changed.

Those skilled in the art may understand that the methods in embodiments of the present invention may also be used in the scenario of a macro NB determining the paging range, and may make various modifications and equivalent substitutions to some technical features of the present invention in the scenario of a macro NB.

By using the method, apparatus, and system for paging a UE according to embodiments of the present invention, a downlink data notification message inclusive of paging indicator information is sent to the core network control plane entity, so that the core network control plane entity can page the UE in a certain paging range. Therefore, system resources are saved and system loads are reduced.

Part of the technical solution according to the embodiments of the present invention may be implemented by a program instructing relevant hardware. The program may be stored in a readable storage medium. The storage medium may be any medium capable of storing program codes, such as a Read Only Memory (ROM), a Random Access Memory (RAM), a magnetic disk, or a Compact Disk-Read Only Memory (CD-ROM).

Finally, it should be noted that the above embodiments are used only to describe the technical solution of the present invention instead of limiting the technical solution of the present invention. Although the present invention is described in detail with reference to the foregoing embodiments, those of ordinary skill in the art should understand that they can still make modifications to the technical solution described in the foregoing embodiments or make equivalent substitutions to some technical features thereof, without departing from the spirit and scope of the technical solution of the embodiments of the present invention.

What is claimed is:

1. An apparatus for paging a User Equipment (UE), the apparatus comprising:
a processor and a computer-readable storage medium coupled to the processor, the computer-readable storage medium comprising instructions that, when executed by the processor, cause the apparatus to:
receive a downlink data notification message comprising a bearer ID of a Packet Data Network (PDN) connection corresponding to a downlink packet;
determine a home eNodeB (HeNB) according to the bearer ID, wherein the bearer ID corresponding to the downlink packet is from the HeNB; and
send a first paging message comprising an identifier of the HeNB to the HeNB which is not an eNodeB in a user registration area of the UE.

2. The apparatus according to claim 1, wherein the computer-readable storage medium comprises instructions that, when executed by the processor further cause the apparatus to:
send a third paging message to an eNodeB in the user registration area of the UE, if no paging response of the UE is received within a preset period of time.

3. The apparatus according to claim 1, wherein the downlink data notification message is sent by a Serving Gateway.

4. The apparatus according to claim 1, wherein the identifier of the HeNB is an IP address of the HeNB.

5. The apparatus according to claim 1, wherein the first paging message further comprises an identifier of the UE.

6. The apparatus according to claim 5, wherein the identifier of the UE is IMSI or S-TMSI.

7. The apparatus according to claim 1, wherein the apparatus is a core network control plane entity.

8. The apparatus according to claim 1, wherein the core network control plane entity is a mobility management entity (MME).

9. The apparatus according to claim 1, wherein the user registration area is a TAI list.

10. A method for paging a User Equipment (UE), comprising:
receiving, by a core network control plane entity, a downlink data notification message comprising a bearer ID of a Packet Data Network (PDN) connection corresponding to a downlink packet;
determining, by the core network control plane entity, home eNodeB (HeNB) according to the bearer ID, wherein the bearer ID corresponding to the downlink packet is from the HeNB; and
sending, by the core network control plane entity, a first paging message comprising an identifier of the HeNB to the HeNB which is not an eNodeB in a user registration area of the UE.

11. The method according to claim 10, wherein the method further comprises:
sending a third paging message to an eNodeB in the user registration area, if no paging response of the UE is received within a preset period of time.

12. The method according to claim 10, wherein the downlink data notification message is sent by a Serving Gateway.

13. The method according to claim 10, wherein the identifier of the HeNB is an IP address of the HeNB.

14. The method according to claim 10, wherein the first paging message further comprises an identifier of the UE.

15. The method according to claim 14, wherein the identifier of the UE is IMSI or S-TMSI.

16. The method according to claim 10, wherein the core network control plane entity is a mobility management entity (MME).

17. The method according to claim 10, wherein the user registration area is a TAI list.

18. A system for paging a User Equipment (UE), comprising a HeNB and an MME, wherein the MME is configured to:
receive a downlink data notification message comprising a bearer ID of a PDN connection corresponding to a downlink packet;
select the HeNB according to the bearer ID, wherein the bearer ID corresponding to the downlink packet is from the HeNB; and send a first paging message comprising an identifier of the HeNB to the HeNB without sending a second paging message to an eNodeB in a user registration area of the UE.

19. The system according to claim 18, wherein the MME is further configured to send a third paging message to an eNodeB in the user registration area of the UE, if no paging response of the UE is received within a preset period of time.

20. The system according to claim 19, wherein the identifier of the HeNB is an IP address of the HeNB.

* * * * *